United States Patent
Yamada (10) Patent No.: US 7,706,400 B2
(45) Date of Patent: Apr. 27, 2010

(54) TRANSPORT STREAM PROCESSING DEVICE AND TRANSPORT STREAM PROCESSING METHOD

(75) Inventor: Mikihiko Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 523 days.

(21) Appl. No.: 11/568,581

(22) PCT Filed: May 27, 2005

(86) PCT No.: PCT/JP2005/009788

§ 371 (c)(1),
(2), (4) Date: Nov. 2, 2006

(87) PCT Pub. No.: WO2005/117323

PCT Pub. Date: Dec. 8, 2005

(65) Prior Publication Data

US 2008/0008100 A1    Jan. 10, 2008

(30) Foreign Application Priority Data

May 28, 2004    (JP)    ............................. 2004-159139

(51) Int. Cl.
*H04J 3/00*    (2006.01)
(52) U.S. Cl. ...................... 370/464; 370/503
(58) Field of Classification Search ....................... None
See application file for complete search history.

(56) References Cited

U.S. PATENT DOCUMENTS 5,805,602 A    9/1998  Cloutier et al.

2002/0097678 A1 *  7/2002  Bisher et al. ................. 370/232
2002/0150126 A1 * 10/2002  Kovacevic ................... 370/503
2003/0142752 A1    7/2003  Demas et al.
2003/0206605 A1   11/2003  Anderson

FOREIGN PATENT DOCUMENTS

EP    1335604    8/2003

(Continued)

OTHER PUBLICATIONS

English language Abstract of JP 2002-281445.

(Continued)

*Primary Examiner*—Chi H Pham
*Assistant Examiner*—Fan Ng
(74) *Attorney, Agent, or Firm*—Greenblum & Bernstein P.L.C.

(57) ABSTRACT

A processor detects a data error in the TS packet by utilizing a value of "adaptation_field_control" and a value of "adaptation_field_length" included in the TS packet of a transport stream. A TS packet filter of the processor deletes the relevant TS packet in the transport stream if the data error in the TS packet is detected, and outputs the relevant TS packet to a PID filter if the data error in the TS packet is not detected. The PID filter detects PCR (Program Time Clock) from the TS packet. In a period of time when the PCR does not arrive at a clock reproducer, a frequency of a reference clock when the last PCR arrived is maintained, and then, when the PCR arrives at the clock reproducer, a value of STC (System Time Clock) is set and the frequency of the reference clock CK is controlled by the clock reproducer such that the value of the STC becomes equal to a value of the new PCR.

15 Claims, 6 Drawing Sheets

FOREIGN PATENT DOCUMENTS

| | | |
|---|---|---|
| JP | 9-064860 | 3/1997 |
| JP | 9-312634 | 12/1997 |
| JP | 3065276 | 5/2000 |
| JP | 2002-281445 | 9/2002 |
| JP | 2003-298874 | 10/2003 |
| JP | 2004-128870 | 4/2004 |

OTHER PUBLICATIONS

English language Abstract of JP 2003-298874.
English language Abstract of JP 2004-128870.
English language Abstract of JP 10-313281.
English language Abstract of JP 9-312634.
English language Abstract of JP 9-064860.
English language translation of paragraphs [0021]-[0025], [0031]-[0033], [0036] and Fig. 1 of JP 9-312634.
English language translation of paragraphs [0012]-[0020], [0027]-[0030], [0034], [0035] and Figs. 2-6 of JP 9-312634.
English language translation of paragraphs [0021]-[0026], [0031]-[0033], [0036], and Fig. 1 of JP 9-312634.

\* cited by examiner

TRANSPORT STREAM PROCESSING DEVICE AND TRANSPORT STREAM PROCESSING METHOD

TECHNICAL FIELD

The present invention relates to a transport stream processing device that processes a transport stream and a transport stream processing method.

BACKGROUND ART

In recent years, in television broadcasting, an encoding method compliant with MPEG2 (Moving Picture Experts Group) standard defined in ISO/IEC13318-1 or the like has been employed as a method for applying a video signal and an audio signal to a high-efficiency compression encoding.

In a receiving device that decodes the video signal and the audio signal encoded in such a high-efficiency compression encoding method, a reference clock thereof needs to be synchronized with a reference clock of a transmitting device. Therefore, as a time reference value, for example, data of PCR (Program Clock Reference) indicating a reference time is included in a transport stream packet (hereinafter, referred to as a TS packet) in a transport stream transmitted from the transmitting device. More specifically, the PCR is stored in an adaptation field of the TS packet.

In the receiving device, an STC (System Time Clock) is reproduced, based on the PCR detected from the received TS packet. Based on a value of the STC, a frequency of the reference clock is adjusted. As a result, the synchronization between the reference clock of the receiving device and the reference clock of the transmitting device can be ensured.

A data error may be caused in the TS packet of the transport stream by a transmission error due to a jitter in a transmission channel, or the like.

For example, in Patent Document 1, an error recovering method when an error arises in section data in the TS packet is suggested. In this error recovering method, by matching an extracted effective data length with data length information in the section on a byte basis, a starting position of the next extracted section can be recognized.

[Patent Document 1] JP 3065276 B

DISCLOSURE OF THE INVENTION

Problems to be Solved by the Invention

However, when fluctuations in a value of the PCR included in the transport stream are caused by the transmission error due to the jitter in the transmission channel or the like, the frequency of the reference clock reproduced in the receiving device becomes unstable, so that the video signal and the audio signal are not decoded normally.

According to the above-described error recovering method, when loss or error is caused in the data of the adaptation field by the transmission error, the STC of the receiving device is reproduced based on the incorrect PCR. In this case, the synchronization processing between the reference clock in the receiving device and the reference clock in the transmitting device is performed based on the incorrect PCR.

The synchronization processing of TS packets received subsequently is performed using the STC reproduced based on the incorrect PCR. Thus, the synchronization processing based on the incorrect PCR will be propagated. This impedes the ensuring of normal synchronization between the reference clock of the receiving device and the reference clock of the transmitting device.

Furthermore, the receiving device performs unnecessary synchronization processing based on the incorrect PCR, resulting in wasteful load on the TS packet processing.

An object of the present invention is to provide a transport stream processing device and a transport stream processing method, in which when a data error arises in a transport stream packet, the propagation of the data error is prevented, normal synchronization of the reference clock is ensured, and the load on synchronization processing is reduced.

Means for Solving the Problems (1)

A transport stream processing device according to one aspect of the present invention is a transport stream processing device that processes a transport stream including a transport stream packet including time information, comprising a controller that generates a reference clock and controls a frequency of the reference clock based on the time information included in the transport stream packet in the transport stream, a transport stream processor that performs predetermined processing for the transport stream in response to the reference clock generated by the controller, a detector that detects a data error in the transport stream packet including the time information in the transport stream, and a stopper that stops the control operation of the frequency of the reference clock by the controller, when the data error of the transport stream packet including the time information is detected by the detector.

In this transport stream processing device, the reference clock is generated by the controller, and the frequency of the reference clock is controlled based on the time information included in the transport stream packet in the transport stream. The predetermined processing is performed for the transport stream by the transport stream processor in response to this generated reference clock. Moreover, the data error in the transport stream packet including the time information in the transport stream is detected by the detector. If the data error in the transport stream packet including the time information is detected by the detector, the control operation of the frequency of the reference clock by the controller is stopped by the stopper.

This prevents the frequency of the reference clock from being controlled based on incorrect time information. Accordingly, improper synchronization between the reference clock controlled by the controller and the reference clock of the transmitting device can be prevented. Also, the synchronization processing based on the incorrect time information can be prevented from being propagated.

Furthermore, unnecessary synchronization processing based on the incorrect time information is not performed. This prevents wasteful load from being caused on the synchronization processing by the controller.

As a result, if the data error arises in the transport stream packet, the propagation of the data error is prevented, normal synchronization of the reference clock is ensured, and the load on the synchronization processing is reduced.

(2)

The stopper may include a deleting unit that deletes at least the time information in the transport stream packet including the data error, when the data error in the transport stream packet including the time information is detected by the detector.

In this case, at least the time information in the transport stream packet including the data error is deleted by the deleting unit.

This prevents the frequency of the reference clock from being controlled based on incorrect time information. Accordingly, improper synchronization between the reference clock controlled by the controller and the reference clock of the transmitting device can be surely prevented. Also, the synchronization processing based on the incorrect time information can be surely prevented from being propagated.

Furthermore, since at least time information in the transport stream packet with the data error arising is not supplied to the controller, the controller is prevented from performing unnecessary synchronization processing based on the incorrect time information. This prevents wasteful load from being caused on the synchronization processing by the controller.

(3)

The controller may maintain the frequency of the reference clock at a value before the deletion of the time information until new time information is supplied, when at least the time information in the transport stream packet is deleted by the deleting unit.

In this case, the frequency of the reference clock is maintained at the value before the deletion of the time information in the period of time from the deletion of at least time information in the transport stream packet to the supply of the new time information. Accordingly, effects by not supplying the time information to the controller are reduced to be small.

(4)

The transport stream packet may include information relating to an adaptation field, and the detector may detect the data error in the transport stream packet based on the information relating to the adaptation field in the transport stream packet.

In this case, the data error in the transport stream packet is detected based on the information of the adaptation field in the transport stream packet. This makes the addition of special information for detecting the data error unnecessary. Accordingly, an increase in a data amount of the transport stream packet for detecting the data error can be prevented.

(5)

The information relating to the adaptation field in the transport stream packet may include a first identifier indicating the presence or absence of the adaptation field and a payload in the transport stream packet, and a second identifier indicating a length of the adaptation field in the transport stream packet, and the detector may determine the presence or absence of the data error in the transport stream packet based on the first identifier and the second identifier.

In this case, the length of the adaptation field in the transport stream packet or its range can be identified by the first identifier. Also, based on the second identifier, the length of the adaptation field in the transport stream packet can be identified. Accordingly, the presence or absence of the data error can be easily determined based on the consistency between the first identifier and the second identifier without adding the special information (6)

The detector may determine that the transport stream packet has the data error when the length of the adaptation field indicated by the second identifier does not satisfy a condition of the length of the adaptation field assumed from the first identifier.

In this case, whether or not the transport stream packet has the data error can be easily determined, based on whether or not the length of the adaptation field indicated by the second identifier satisfies the condition of the length of the adaptation field assumed from the first identifier.

(7)

The first identifier may be a value of the adaptation field control indicating the presence or absence of the adaptation field and the payload in the transport stream packet, and the second identifier may be a value of an adaptation field length indicating the length of the adaptation field in the transport stream packet, and the detector may determine that the transport stream packet has the data error, when the length of the adaptation field calculated from the value of the adaptation field length is not consistent with the length of the adaptation field assumed from the value of the adaptation field control or a range of the length.

In this case, by determining whether or not the length of the adaptation field calculated from the value of the adaptation field length is consistent with the length of the adaptation field assumed from the value of the adaptation field control or the range of the length, it can be easily determined whether or not the transport stream packet has data error.

(8)

The detector may include a first extractor that extracts the value of the adaptation field control from the transport stream packet, a second extractor that extracts the value of the adaptation field length from the transport stream packet, and a determiner that determines whether or not the transport stream packet has the data error based on the value of the adaptation field control extracted by the first extractor and the value of the adaptation field length extracted by the second extractor.

In this case, the value of the adaptation field control is extracted from the transport stream packet by the first extractor. Moreover, the value of the adaptation field length is extracted from the transport stream packet by the second extractor. Furthermore, it is determined by the detector whether or not the transport stream packet has the data error, based on the extracted value of the adaptation field control and the extracted value of the adaptation field length. In this manner, the presence or absence of the data error can be determined by the simple configuration and processing.

(9)

The deleting unit may delete the transport stream packet including the data error, when the data error in the transport stream packet including the time information is detected by the detector.

In this case, if the data error in the transport stream packet including the time information is detected, the transport stream packet itself including the data error is deleted. Thus, the transport stream packet with the data error arising is not supplied to the controller, which prevents the controller from performing unnecessary synchronization based on the incorrect time information. As a result, the load on the synchronization processing by the controller is further reduced.

(10)

A transport stream processing method according to another aspect of the present invention is a transport stream processing method for processing a transport stream including a transport stream packet including time information, comprising generating a reference clock and controlling a frequency of the reference clock based on the time information included in the transport stream packet in the transport stream, performing predetermined processing for the transport stream in response to the generated reference clock, detecting a data error in the transport stream packet including the time information in the transport stream, and stopping the control operation of the frequency of the reference clock, when the data error of the transport stream packet including the time information is detected.

In this transport stream processing method, the reference clock is generated, and the frequency of the reference clock is controlled based on the time information included in the transport stream packet in the transport stream. The predetermined processing is performed for the transport stream in response to this generated reference clock. Moreover, the data error in the transport stream packet including the time information in the transport stream is detected. If the data error in the transport stream packet including the time information is detected, the control operation of the frequency of the reference clock is stopped.

This prevents the frequency of the reference clock from being controlled based on incorrect time information. Accordingly, improper synchronization between the controlled reference clock and the reference clock of the transmitting device can be prevented. Also, the synchronization processing based on the incorrect time information can be prevented from being propagated.

Furthermore, unnecessary synchronization processing based on incorrect time information is not performed. This prevents wasteful load to be caused on the synchronization processing.

As a result, if the data error arises in the transport stream packet, the propagation of the data error is prevented, normal synchronization of the reference clock is ensured, and the load on the synchronization processing is reduced.

(11)

The stopping may include deleting at least the time information in the transport stream packet including the data error, when the data error in the transport stream packet including the time information is detected.

In this case, if the data error in the transport stream packet including the time information is detected, at least the time information in the transport stream packet including the data error is deleted.

This prevents the frequency of the reference clock from being controlled based on incorrect time information. Accordingly, improper synchronization between the controlled reference clock and the reference clock of the transmitting device can be surely prevented. Also, the synchronization processing based on the incorrect time information can be surely prevented from being propagated.

Furthermore, since at least the time information in the transport stream packet with the data error arising is deleted, unnecessary synchronization processing based on the incorrect time information is not performed. This prevents wasteful load from being caused on the synchronization processing.

(12)

The controlling may include maintaining the frequency of the reference clock at a value before the deletion of the time information until new time information is supplied, when at least the time information in the transport stream packet is deleted.

In this case, the frequency of the reference clock is maintained at the value before the deletion of the time information in the period of time from the deletion of at least the time information in the transport stream packet to the supply of the new time information. Accordingly, effects by the deletion of the time information can be reduced to be small.

(13)

The transport stream packet may include information relating to an adaptation field, and the detecting may include detecting the data error in the transport stream packet based on the information relating to the adaptation field in the transport stream packet.

In this case, the data error in the transport stream packet is detected based on the information of the adaptation field in the transport stream packet. This makes the addition of special information for detecting the data error unnecessary. Accordingly, an increase in the data amount of the transport stream packet for detecting the data error can be prevented.

(14)

The information relating to the adaptation field in the transport stream packet may include a first identifier indicating the presence or absence of the adaptation field and a payload in the transport stream packet, and a second identifier indicating a length of the adaptation field in the transport stream packet, and the detecting may include determining the presence or absence of the data error in the transport stream packet based on the first identifier and the second identifier.

In this case, the length of the adaptation field in the transport stream packet or its range can be identified by the first identifier. Also, based on the second identifier, the length of the adaptation field in the transport stream packet can be identified. Accordingly, the presence or absence of the data error can be easily determined based on the consistency between the first identifier and the second identifier without adding the special information.

(15)

The detecting may include determining that the transport stream packet has the data error when the length of the adaptation field indicated by the second identifier does not satisfy a condition of the length of the adaptation field assumed from the first identifier.

In this case, based on whether or not the length of the adaptation field indicated by the second identifier satisfies the condition of the length of the adaptation field assumed from the first identifier, it can be easily determined whether or not the transport stream packet has the data error.

(16)

The first identifier may be a value of the adaptation field control indicating the presence or absence of the adaptation field and the payload, and the second identifier may be a value of an adaptation field length indicating the length of the adaptation field in the transport stream packet, and the detecting may include determining that the transport stream packet has the data error, when the length of the adaptation field indicated by the value of the adaptation field length is not consistent with the length of the adaptation field assumed from the value of the adaptation field control or a range of the length.

In this case, by determining whether or not the length of the adaptation field calculated from the value of the adaptation field length is consistent with the length of the adaptation field assumed from the value of the adaptation field control or the range of the length, it can be easily determined whether or not the transport stream packet has data error.

(17)

The detecting may include the steps of extracting the value of the adaptation field control from the transport stream packet, extracting the value of the adaptation field length from the transport stream packet, and determining whether or not the transport stream packet has the data error based on the extracted value of the adaptation field control, and the extracted value of the adaptation field length.

In this case, the value of the adaptation field control is extracted from the transport stream packet. Also, the value of the adaptation field length is extracted from the transport stream packet. Furthermore, based on the extracted value of the adaptation field control and the extracted value of the adaptation field length, it is determined whether or not the transport stream packet has the data error. Thus, the presence or absence of the data error can be determined by the simple processing.

(18)

The deleting may include deleting the transport stream packet including the data error, when the data error in the transport stream packet including the time information is detected.

In this case, if the data error in the transport stream packet including the time information is detected, the transport stream packet itself including the data error is deleted. This prevents unnecessary synchronization processing based on incorrect time information from being performed. As a result, the load on the synchronization processing is further reduced.

BEST MODE FOR CARRYING OUT THE INVENTION

Hereinafter, a transport stream processing device according to one embodiment of the present invention is described with reference to the drawings.

(1) Configuration of Transport Stream Processing Device

Figure 1:
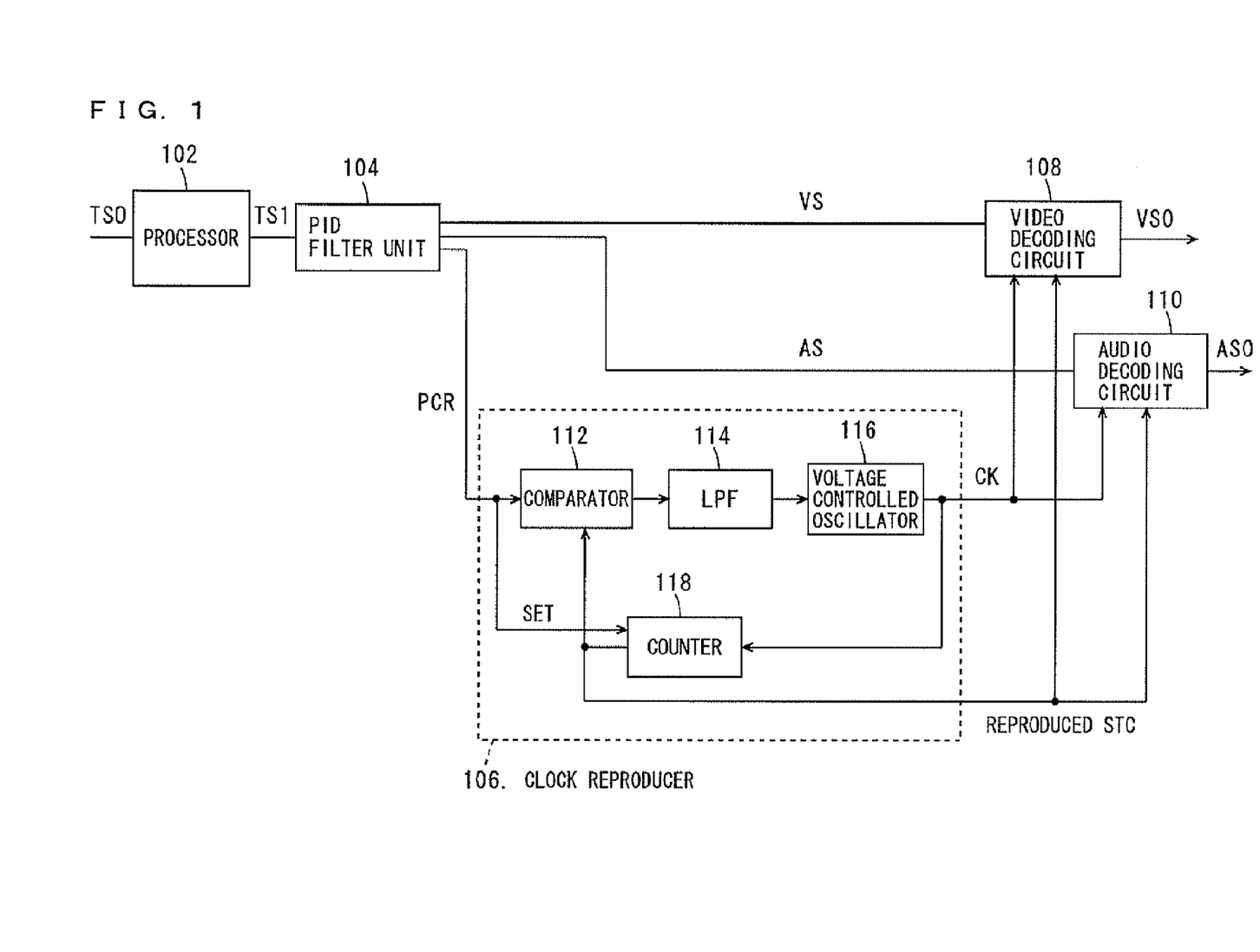
FIG. 1 is a block diagram showing a configuration of a transport stream processing device according to one embodiment of the present invention.

FIG. 1 is a block diagram showing a configuration of a transport stream processing device according one embodiment of the present embodiment.

The transport stream processing device of FIG. 1 is composed of a processor 102, a PID filter unit 104, a clock reproducer 106, a video decoding circuit 108, and an audio decoding circuit 110. This transport stream processing device processes a transport stream encoded in conformity to MPEG2 (Moving Picture Experts Group) standard defined in ISO/IEC13818-1. The transport stream processing device is provided in a receiving device such as a television receiver, a recording device, a reproducing device, or a recording and reproducing device for a recording medium such as a DVD (digital versatile disk), a video tape or a hard disk, or the like.

The processor 102 processes an encoded multiplexed transport stream TS0, which is transmitted from a transmitting device of a broadcasting station or the like. The configuration and operation of the processor 102 will be described later. The PID (Packet Identifier) filter unit 104 includes a separating circuit that separates a video signal VS and an audio signal AS from the transport stream packets (hereinafter, TS packets) in a transport stream TS1 processed by the processor 102. Furthermore, the PID filter unit 104 includes a system decoder that detects a PCR (Program Clock Reference), which is a time reference value included in a header in each TS packet in the transport stream when the video signal VS and the audio signal AS are separated. This PCR indicates a reference time of the transmitting device.

The clock reproducer 106 generates a reference clock CK based on a value of the PCR detected by the PID filter unit 104, and reproduces an STC (System Time Clock).

The video decoding circuit 108 receives the video signal VS separated by the PID filter unit 104, and decodes the video signal VS based on the reference clock CK generated by the clock reproducer 106 and a value of the reproduced STC. A video signal VS0 decoded by the video decoding circuit 108 is supplied to a video output terminal (not shown) or a display device (not shown).

The audio decoding circuit 110 receives the audio signal AS separated by the PID filter unit 104, and decodes the audio signal AS based on the reference clock CK generated by the clock reproducer 106 and the value of the reproduced STC. An audio signal AS0 decoded by the audio decoding circuit 110 is supplied to an audio output terminal (not shown) or an audio output device (not shown).

Next, the clock reproducer 106 is described. The clock reproducer 106 includes a comparator 112, an LPF (Low Pass Filter) 114, a voltage controlled oscillator (VCXO) 116 and a counter 118.

The counter 118 counts pulses of the reference clock CK described later, and outputs a count value as the STC. The count value of the counter 118 is reset every fixed period (for example every day), and is incremented from 0 every count of a pulse of the reference clock CK.

The comparator 112 compares the value of the PCR detected by the PID filter unit 104 and the value of the STC outputted from the counter 118 and outputs a voltage signal corresponding to a difference value between the value of the PCR and the value of the STC. The LPF 114 removes a high-frequency component of the voltage signal outputted from the comparator 112 to output a low-frequency voltage signal.

The voltage controlled oscillator 116 has an operating frequency of 27 MHz, for example, and generates the reference clock CK. The frequency of the reference clock CK generated by the voltage controlled oscillator 116 is controlled according to the level of the low-frequency voltage signal. This allows the difference value between the value of the PCR detected by the PID filter unit 104 and the value of the STC outputted from the counter 118 to fall within a certain range. As a result, the frequency of the reference clock CK outputted from the voltage controlled oscillator 116 is adjusted so as to be consistent with the frequency of the reference clock (system clock) of the transmitting device. Furthermore, the count value of the counter 118 is set to the value of the PCR detected by the PID filter unit 104. The count value of the counter 118 is outputted as the STC.

In this manner, the difference (jitter amount) in the frequency of the reference clock CK outputted from the voltage controlled oscillator 116 is corrected. As a result, the synchronization of the reference clock CK generated by the clock reproducer 106 with the reference clock of the transmitting device is enabled.

(2) Structure of TS Packet of Transport Stream

Figure 2:
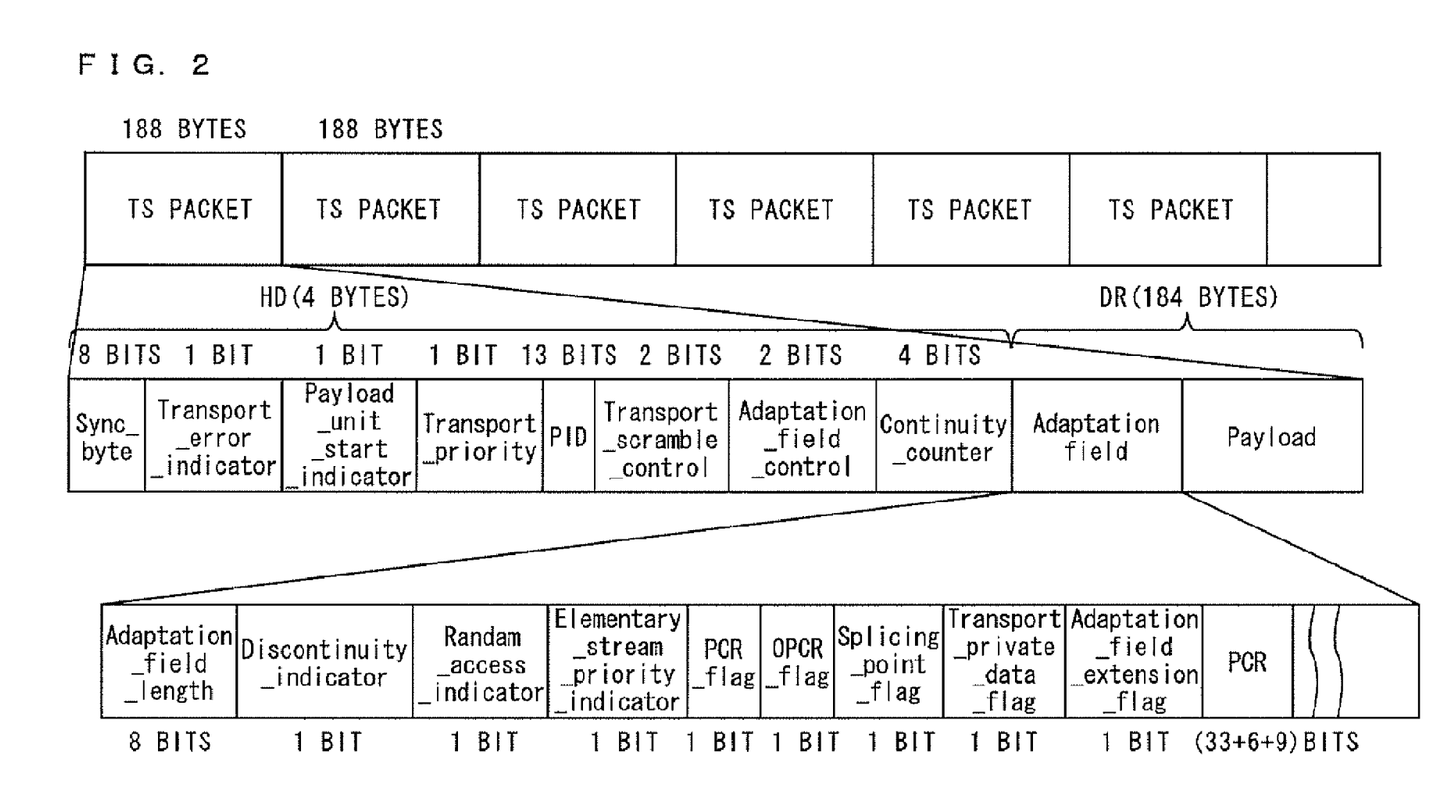
FIG. 2 is a chart showing a part of a structure of a TS packet of a transport stream.

Now, a structure of the TS packet of the transport stream is described using FIG. 2. FIG. 2 is a chart showing a part of the structure of the TS packet of the transport stream. The structure of the TS packet is defined in ISO/IEC13818-1. In FIG. 2, bits are represented in the order of a higher-order bit to a lower-order bit from left to right.

The length of one TS packet is 188 bytes (decimal system). Each TS packet has a header HD of 4 bytes and a data region DR of 184 bytes.

The header HD includes "sync_byte (synchronization byte)" of 8 bits, "transport_error_indicator" of 1 bit, "payload_unit_start_indicator" of 1 bit, "transport_priority" of 1 bit, "PID (packet identifier)" of 13 bits, "transport_scramble_control" of 2 bits, "adaptation_field_control" of 2 bits, "adaptation_field_control" and "continuity_counter" of 4 bits.

The data region DR includes both the adaptation field and the payload, includes only the adaptation field, or includes only the payload. In the payload are stored an encoded video signal, encoded audio signal, encoded data, and the like.

The adaptation field includes "adaptation_field_length" of 8 bits, "discontinuity_indicator" of 1 bit, "random_access_indicator" of 1 bit, "elementary_stream_priority_indicator" of 1 bit, "PCR_flag" of 1 bit, "OPCR flag" of 1 bit, "splicing_point_flag" of 1 bit, "transport_private_data_flag" of 1 bit, "adaptation_field_extension_flag" of 1 bit, and "PCR program_clock_reference" of 48 bits. The "PCR_flag" indicates whether or not "PCR" exists in the relevant adaptation field.

(3) "adaptation_field_control"

Here, the "adaptation_field_control" is described. As described above, the "adaptation_field_control" is composed of a total of 2 bits of the 27th bit and the 28th bit from the head of the TS packet, and indicates the presence or absence of the adaptation field and the presence or absence of the payload.

Hereinafter, more specifically, the "adaptation_field_control" is described. As a value of the "adaptation_field_control" "00" (binary notation), which has been reserved, is not taken according to a standard.

If the value of the "adaptation_field_control" is "01", it indicates that the data region DR of the TS packet is composed of only the payload, and that the adaptation field does not exist. Accordingly, the length of the adaptation field is 0 byte.

If the value of the "adaptation_field_control" is "10", it indicates that the data region DR of the TS packet is composed of only the adaptation field, and that the payload does not exist. Accordingly, the length of the adaptation field is 184 bytes.

If the value of the "adaptation_field_control" is "11", it indicates that the TS packet is composed of the adaptation field and the payload. Accordingly, the length of the adaptation field is not less than 1 byte and not more than 183 bytes.

(4) "adaptation_field_length"

Next, the "adaptation_field_length" is described. If the adaptation field exists in the data region DR of the TS packet, the 33rd bit and later from the head of the TS packet are the adaptation fields. As described above, the "adaptation_field_length" is composed of the first 8 bits (=1 byte) of the adaptation field.

The value of the "adaptation_field_length" indicates the length of the adaptation field excluding the length of the "adaptation_field_length". That is, the value of the "adaptation_field_length" indicates the number of bytes immediately after the "adaptation_field_length" to the end of the adaptation field. This structure of this "adaptation_field_length" itself is similar to that of "adaptation_field_length" of a conventional TS packet.

The length of the data region DR is 184 bytes. Accordingly, if only the payload exists in the data region DR of the TS packet, the value of the "adaptation_field_length" is 0. If only the adaptation field exists in the data region DR of the TS packet, the value of the "adaptation_field_length" is 183. If the adaptation field and the payload exist in the data region DR of the TS packet, the value of the "adaptation_field_length" is not less than 1 and not more than 182.

(5) Method for Detecting Data Error

As described above, the possible length of the adaptation field calculated based on the value of the "adaptation_field_control" and the value of the "adaptation_field_length" both indicate information of the byte length of the adaptation field.

According to the present embodiment, by utilizing the value of the "adaptation_field_control" and the value of the "adaptation_field_length", the data error of the TS packet is detected.

More specifically, for example, if the value of the "adaptation_field_control" is "01", it indicates that the data region DR of the TS packet is composed of only the payload, and that the adaptation field does not exist. In this case, the PCR is not included in the TS packet.

If the "adaptation_field_control" is "10", it indicates that the data region DR of the TS packet is composed of only the adaptation field, and that the payload field does not exist. Accordingly, it can be assumed that the length of adaptation field excluding the "adaptation_field_length" is 183 bytes. In contrast, if the value of the "adaptation_field_length" is a value other than 183, is found that the relevant TS packet has the data error.

If the value of the "adaptation_field_control" is "11", it indicates that the data region DR of the TS packet is composed of the adaptation field and the payload. Accordingly, it can be assumed that the length of the adaptation field excluding the "adaptation_field_length" is not less than 1 byte and not more than 182 bytes. In contrast, if the value of "adaptation_field_control" is 0 or not less than 183 bytes, it is found that the data error exists in the relevant TS packet.

In this manner, by utilizing the two pieces of information of the length of the adaptation field, the data error of the TS packet can be detected.

(6) Configuration of Processor 102

Figure 3:
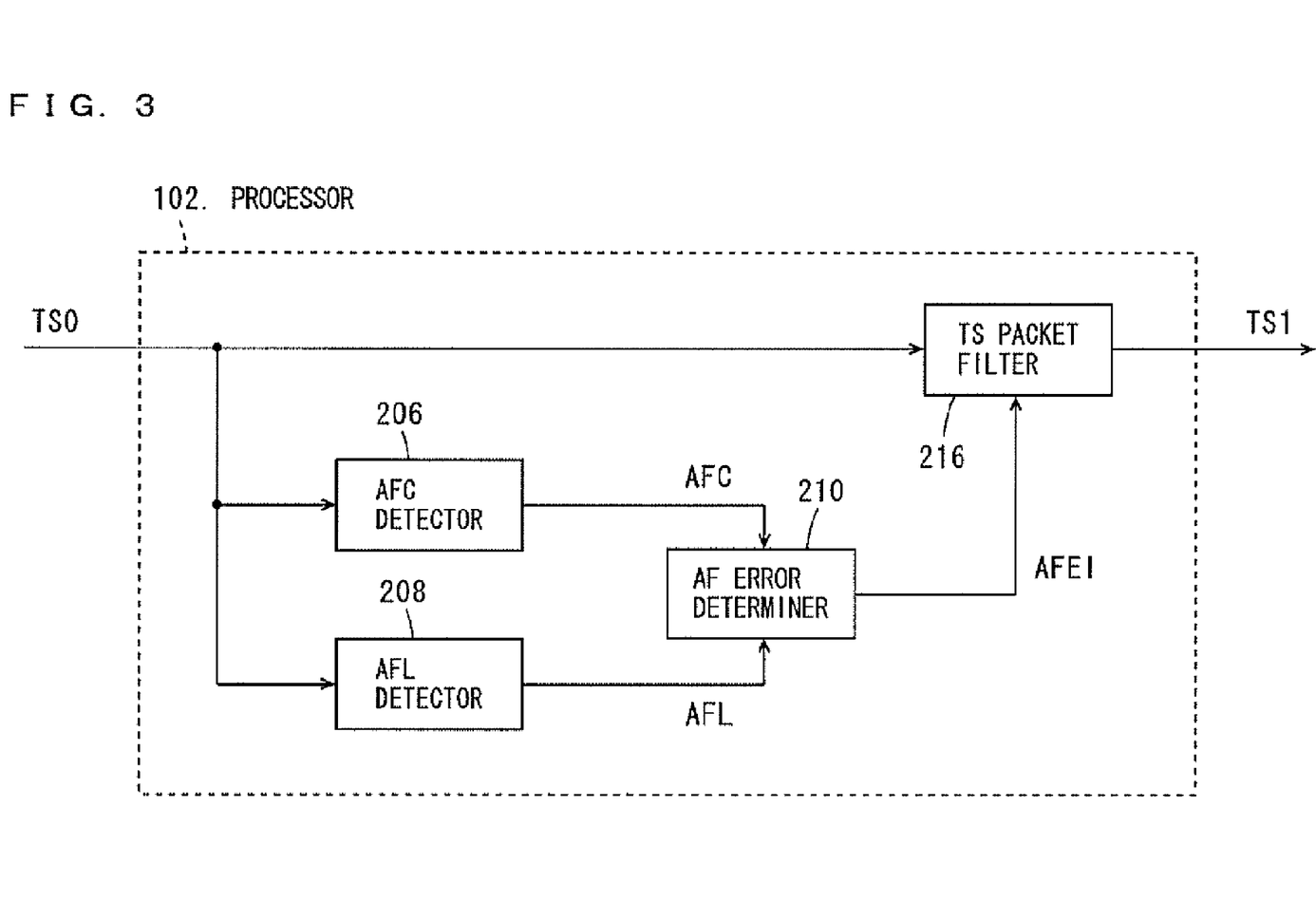
FIG. 3 is a block diagram showing a configuration of a processor in the transport stream processing device of FIG. 1.

Next, the processor 102 of FIG. 1 is described in detail using FIG. 3. FIG. 3 is a block diagram showing a configuration of the processor 102 in the transport stream processing device of FIG. 1.

The processor 102 includes an AFC (adaptation_field_control) detector 206, an AFL (adaptation_field_length) detector 208, an AF (adaptation_field) error determiner 210, and a TS packet filter 216.

The transport stream TS0 inputted to the processor 102 is supplied to the AFC detector 206, the AFL detector 208, and the TS packet filter 216.

The AFC detector 206 detects the "adaptation_field_control" (hereinafter, referred to as AFC) of 2 bits as a first identifier from the TS packet of the transport stream TS0. The AFL detector 208 detects the "adaptation_field_length" (hereinafter, referred to as AFL) of 2 bits as a second identifier from the TS packet of the transport stream TS0.

The AF error determiner 210 determines whether or not the length of the adaptation field assumed from the value of the AFC detected by the AFC detector 206 or a range thereof, and the length of the adaptation field calculated from the value of the AFL detected by the AFL detector 208 are consistent with each other. If the length of the adaptation field assumed from the value of the AFC or its range and the length of the adaptation field calculated from the value of the AFL are consistent with each other, this AF error determiner 210 supplies the TS packet filter 216 an error signal AFEI indicating that there is a data errors and if the length of the adaptation field assumed from the value of the AFC or its range and the length of the adaptation field calculated from the value of the AFL are not consistent with each other, the AF error determiner 210 supplies the TS packet filter 216 an error signal AFEI indicating that there is no data error.

The TS packet filter 216 deletes the relevant TS packet in the transport stream TS0 if the error signal AFEI supplied from the AF error determiner 210 indicates that the TS packet has the data error, and the transport stream TS1 not including the deleted TS packet is outputted. Also, if the error signal AFEI supplied from the AF error determiner 210 indicates that the TS packet does not have the data error, the TS packet filter 216 outputs the transport stream TS1 without deleting the relevant TS packet in the transport stream TS0.

(7) Determining Operation of Data Error

Figure 4:
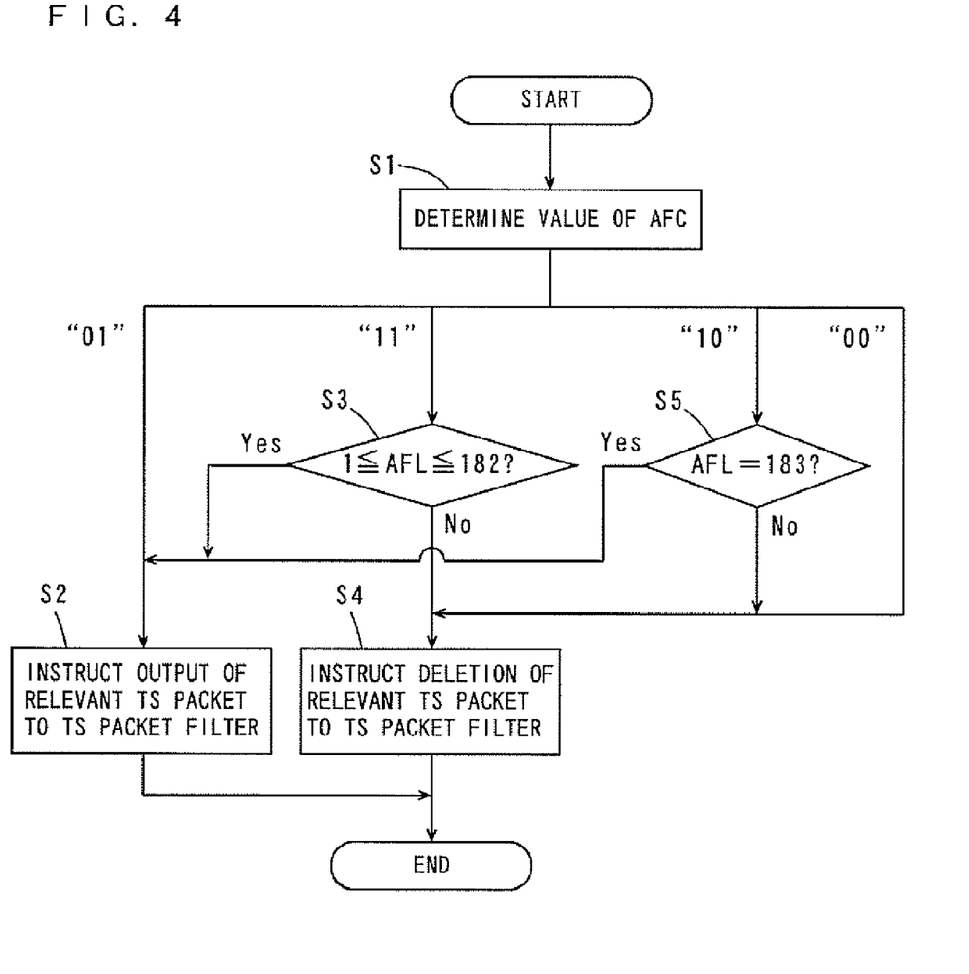
FIG. 4 is a flowchart showing determination operation of a data error by an AF error determiner of the processor in FIG. 3.

FIG. 4 is a flowchart showing determination operation of the data error by the AF error determiner 210 of the processor 102 of FIG. 3. In FIG. 4, also, the "adaptation_field_control" is represented by AFC and the "adaptation_field_length" is represented by AFL.

First, the AF error determiner 210 determines the value of the AFC detected by the AFC detector 206 (step S1).

If the value of the AFC is "01" in step S1, the data region DR is composed of only the payload. Accordingly, the AF error determiner 210 instructs the TS packet filter 216 to output the relevant TS packet by the error signal AFEI (step S2).

If the value of the AFC is "11" in step S1, the data region DR is composed of the adaptation field and the payload. Accordingly, the AF error determiner 210 determines whether or not the value of the AFL detected by the AFL detector 208 is not less than 1 and not more than 182 (step S3).

If the value of the AFL is not less than 1 and not more than 182 in step S3, the range of the length of the adaptation field assumed from the value of the AFC and the length of the adaptation field calculated from the value of the AFL are consistent, and thus, it can be considered that in the TS packet, the data error does not exist. In this case, the AF error determiner 210 instructs the TS packet filter 216 to output the relevant TS packet by the error signal AFEI (step S2).

If the value of the AFL is not within the range of not less than 1 and not more than 182, the range of the length of the adaptation field assumed from the value of the AFC and the length of the adaptation field calculated from the value of the AFL are not consistent, and thus, it can be considered that in the TS packet, the data error exists. In this case, the AF error determiner 210 instructs the TS packet filter 216 to delete the relevant TS packet by the error signal AFEI (step S4).

If the value of the AFC is "10" in step S1, the data region DR is composed of only the adaptation field. Accordingly, the AF error determiner 210 determines whether or not the value of the AFL detected by the AFL detector 208 is 183 (step S5).

If the value of the AFL is 183 in step S5, the length of the adaptation field assumed from the value of the AFC and the length of the adaptation field calculated from the value of the AFL are consistent, and thus, it can be considered that in the TS packet, the data error does not exist. In this case, the AF error determiner 210 instructs the TS packet filter 216 to output the relevant TS packet by the error signal AFEI (step S2).

If the value of the AFL is not 183 in step S5, the length of the adaptation field assumed from the value of the AFC and the length of the adaptation field calculated from the value of the AFL are not consistent, and thus, it can be considered that in the TS packet, the data error exists. In this case, the AF error determiner 210 instructs the TS packet filter 216 to delete the relevant TS packet by the error signal AFEI (step S4).

Essentially, the value of the AFC is never "00". Accordingly, if the value of the AFC is "00" in step S1, it can be considered that in the TS packet, the data error exists. In this case, the AF error determiner 210 instructs the TS packet filter 216 to delete the relevant TS packet by the error signal AFEI (step S4).

(8) Processing of Clock Reproducer 106

Next, the processing of the clock reproducer 106 based on the transport stream TS1 outputted from the processor 102 is described with reference to FIG. 1.

Here, a case where the output of the relevant TS packet is instructed because the data error is not detected by the AF error detector 210 of FIG. 3, and a case where the deletion of the relevant TS packet is instructed because the data error is detected by the AF error determiner 210 are described.

The transmitting device transmits TS packets including the PCR at a constant cycle. Furthermore, a TS packet having a PMT (program map table) is included in the transport stream transmitted from the transmitting device. In this case, the PMT is a kind of PSI (program specific information), including the PID of a component (video, audio and data) constituting one organized channel, stream_type (stream type identification), and the like. The TS packet including the PCR can be specified based on the description of this PMT.

The PID filter unit 104 of FIG. 1 specifies the TS packet including the PCR based on the description in the PMT to detect the PCR from the TS packet. The detected PCR is supplied to the clock reproducer 106.

(8-1) Operation when Data Error is not Detected

First, the operation of the clock reproducer 106 when the data error of the TS packet is not detected by the AF error determiner 210 of FIG. 3 is described.

Figure 5:
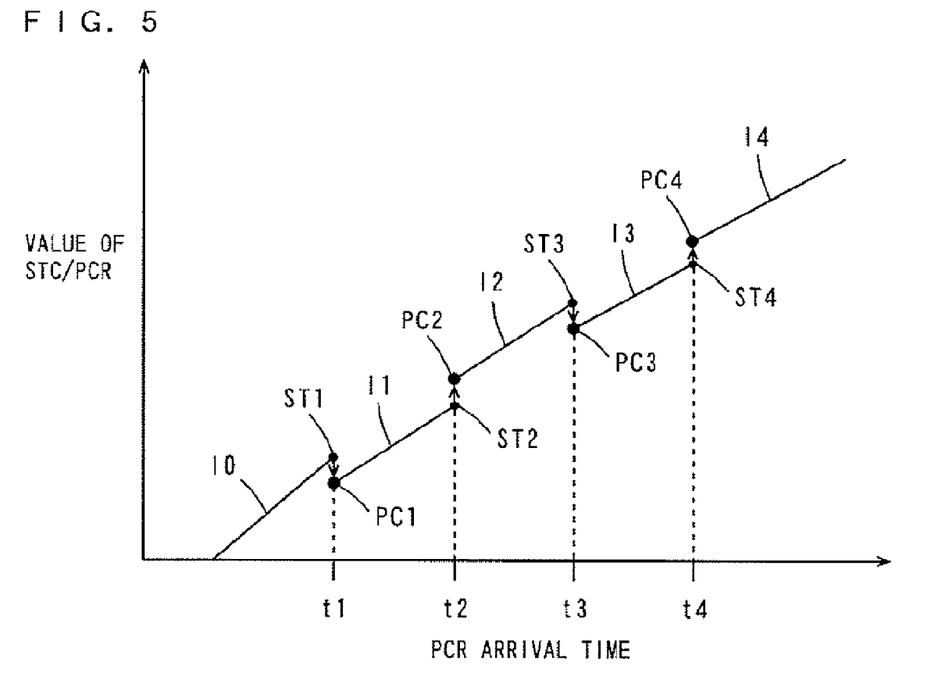
FIG. 5 is a chart for explaining operation of a clock reproducer when the data error of the TS packet is not detected.

FIG. 5 is a chart for explaining the operation of the clock reproducer 106 when the data error of the TS packet is not detected.

In FIG. 5, the abscissa axis indicates an arrival time of the PCR at the clock reproducer 106, and the ordinate axis indicates the value of the PCR and the value of the STC. In FIG. 5, the value of the PCR arriving at the clock reproducer 106 is indicated by a large dot, and the change in the value of the STC is indicated by the lines I0 to I4. The frequency of the reference clock CK corresponds to the inclinations of the lines I0 to I4.

If the data error of the TS packet is not detected, the TS packet is outputted from the TS packet filter 216 of the processor 102. The PID filter unit 104 detects the PCR from the TS packet.

Next, in the clock reproducer 106, the value of the PCR detected by the PID filter unit 104 and the value of the STC outputted from the counter 118 are compared to control the frequency of the reference clock CK so that a difference value between these values becomes 0.

The value of the PCR in the TS packet transmitted from the transmitting device increases in proportion to time passage. However, the value of the PCR arriving at the clock reproducer 106 does not increase completely linearly due to a jitter of the transmission channel.

First, the value of the STC reproduced by the clock reproducer 106 increases with the inclination of line I0 until a time t1. At the time t1, if a value ST1 of the STC is larger than a value PC1 of the PCR, the clock reproducer 106 sets the value of the STC to the value PC1 of the PCR, and reduces the frequency of the reference clock CK. Accordingly, the inclination of the change in the value of the reproduced STC becomes smaller as indicated by the line I1.

At a time t2, if a value ST2 of the STC is smaller than a value PC2 of the PCP, the clock reproducer 106 sets the value of the STC to the value PC2 of the PCR, and increases the frequency of the reference clock CK. Accordingly, the inclination of the change in the value of the reproduced STC becomes larger as indicated by the line I2.

At a time t3, if a value ST3 of the STC is larger than a value PC3 of the PCR, the clock reproducer 106 sets the value of the STC to the value PC3 of the PCR, and reduces the frequency of the reference clock CK. Accordingly, the inclination of the chance in the value of the reproduced STC becomes smaller as indicated by the line I3.

At a time t4, it a value ST4 of the STC is smaller than a value PC4 of the PCR, the clock reproducer 106 sets the value of the STC to the value PC4 of the PCR, and increases the frequency of the reference clock CK. Accordingly, the inclination of the change in the value of the reproduced STC becomes larger as indicated by the line I4.

In this manner, the value of the STC is set and the frequency of the reference clock CK is controlled such that the value of the STC becomes equal to the value of the PCR by the operation of the clock reproducer 106.

Figure 6:
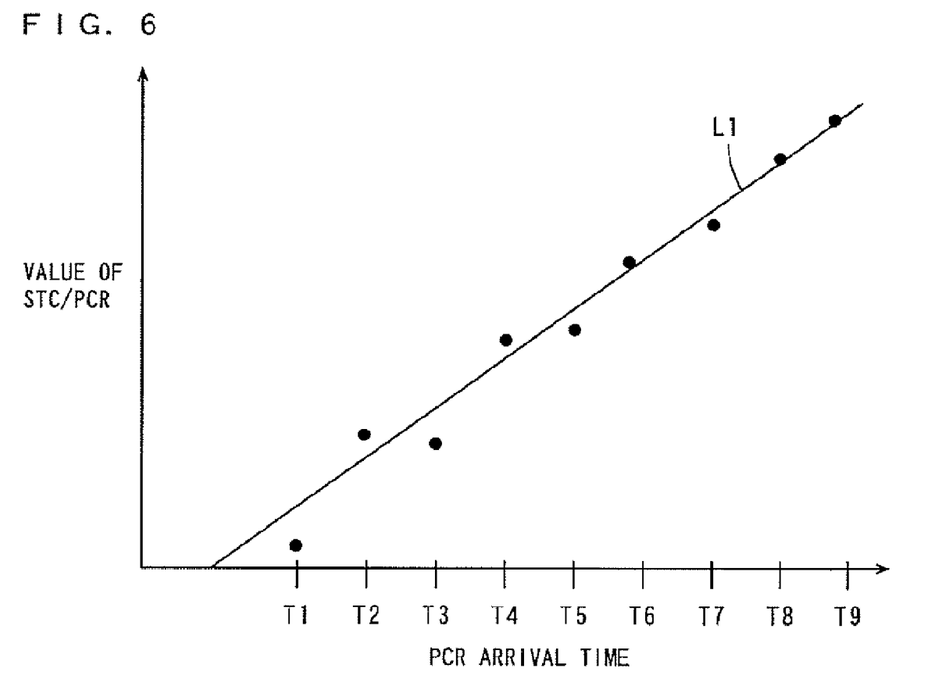
FIG. 6 is a chart showing a relation between an arrival time of a PCR, and a value of the PCR and a value of STC when the data error of the TS packet does not exist.

FIG. 6 is a chart showing a relation between the arrival time of the PCR, and the value of the PCR and the value of the STC when the TS packet does not have the data error.

In FIG. 6, the abscissa axis indicates an arrival time of the PCR at the clock reproducer 106, and the ordinate axis indicates the value of the PCR and the value of the reproduced STC. In FIG. 6, the value of the PCR arriving at the clock reproducer 106 is indicated by a dot, and the change in the value of the reproduced STC is indicated by a line L1. While in FIG. 6, the change in the value of the STC is approximately indicated by the line L1, in practice, an inclination of the line L1 is sequentially changed based on the difference value between the value of PCR and the value of the STC, as shown in FIG. 5.

In the example of FIG. 6, the PCR arrives at the clock reproducer 106 at times T1, T2, T3, T4, T5, T6, T7, T8, T9.

As is clear from FIG. 6, by the above-described operation of the clock reproducer 106, the value of the reproduced STC is approximated to the value of the RCR, and the frequency of the reference clock CK generated by the clock reproducer 106 becomes equal to the frequency of the reference clock in the transmitting device. That is, the reference clock CK in the transport stream processing device is synchronized with the reference clock in the transmitting device.

Thus, the video signal VS and the audio signal AS are decoded by the video decoding circuit 108 and the audio decoding circuit 110 at correct timing.

(8-2) Operation when Data Error is Detected

Next, the operation of the clock reproducer 106 when the data error of the TS packet is detected by the AF error determiner 210 of FIG. 4 is described.

If the data error arises in the TS packet, there is a possibility that the error arises in the PCR included in the TS packet. In this case, when the incorrect PCR is supplied to the clock reproducer 106, the clock reproducer 106 operates so that the difference value between the value of the incorrect PCR and the value of the STC becomes 0. Therefore, the reference clock CK in the transport stream processing device is not normally synchronized with the reference clock in the transmitting device.

In the transport stream processing device according to the present embodiment, if the data error arises in the TS packet, the TS packet is not outputted from the TS packet filter 216 of the processor 102. Accordingly, the PID filter unit 104 does not output the PCR.

Figure 7:
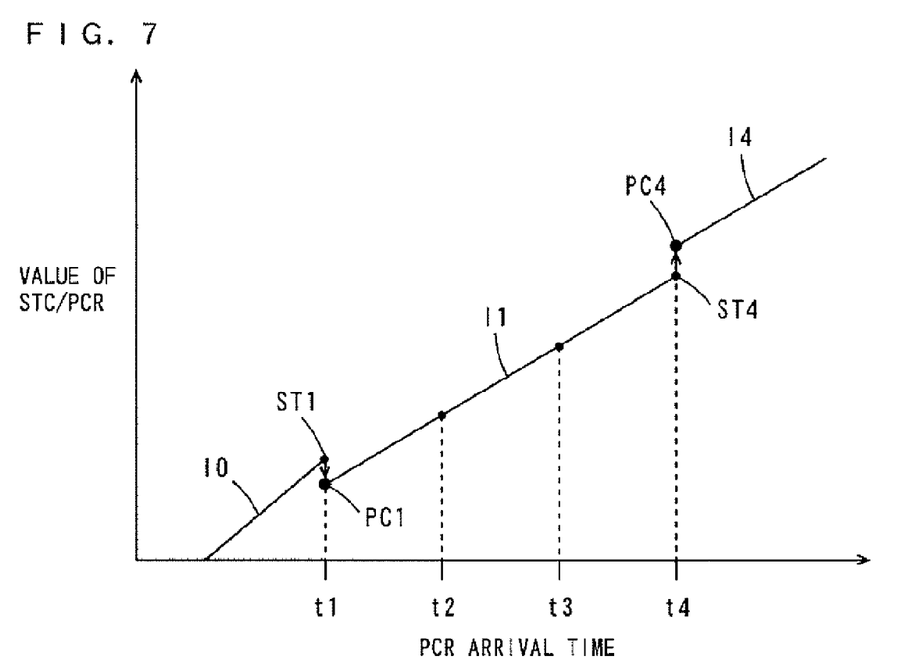
FIG. 7 is a chart for explaining operation of the clock reproducer when the data error of the TS packet is detected.

FIG. 7 is a chart for explaining the operation of clock reproducer 106 when the data error of the TS packet is detected.

In FIG. 7, the abscissa axis indicates an arrival time of the PCR at the clock reproducer 106, and the ordinate axis indicates the value of the PCR and the value of the STC. In FIG. 7, the value of the PCR arriving at the clock reproducer 106 is indicated by a large dot, and the change in the value of the STC is indicated by the lines I0, I1, I4. The frequency of the reference clock CK corresponds to the inclinations of the lines I0, I1, I4.

First, the value of the STC reproduced by the clock reproducer 106 increases with the inclination of line I0 until the time t1. At the time t1, if the value ST1 of the STC is larger than the value PC1 of the PCR, the clock reproducer 106 sets the value of the STC to the value PC1 of the PCR, and reduces the frequency of the reference clock CK. Accordingly, the inclination of the change in the value of the reproduced STC becomes smaller as indicated by the line I1.

If the data error due to a transmission error is detected at the time t2, the STC does not arrive at the clock reproducer 106. In this case, in the comparator 112 of the clock reproducer 106, the comparison between the value of the PCR and the value of the STC is not performed. The clock reproducer 106, therefore, maintains the frequency of the reference clock CK at the frequency controlled at the time t1. This allows the inclination of the change in the value of the reproduced STC to be maintained at the inclination of the line I1.

Furthermore, if the data error due to a transmission error is detected at the time t3, the STC does not arrive at the clock reproducer 106. In this case, in the comparator 112 of the clock reproducer 106, the comparison between the value of the PCR and the value of the STC is not performed. The clock reproducer 106, therefore, maintains the frequency of the reference clock CK at the frequency controlled at the time t1. This allows the inclination of the change in the value of the reproduced STC to be maintained at the inclination of the line I1.

At the time t4, if the value ST4 of the STC is smaller than the value PC4 of the PCR, the clock reproducer 106 sets the value of the STC to the value PC4 of the PCR, and increases the frequency of the reference clock CK. Accordingly, the inclination of the change in the value of the reproduced STC becomes larger as indicated by the line I4.

In this manner, in a period of time when the PCR does not arrive at the clock reproducer 106, the frequency of the reference clock CK at the time of arrival of the last PCR is maintained. That is, the reset of the value of the STC by the clock reproducer 106, and the control operation over the reference clock CK are stopped. Thereafter, when the PCR arrives at the clock reproducer 106, the value of the STC is set by the clock reproducer 106 and the frequency of the reference clock CK is controlled such that the value of the STC becomes equal to a value of the new PCR. Accordingly, the deletion of the TS packet does not largely affect the operation of the clock reproducer 106.

Figure 8:
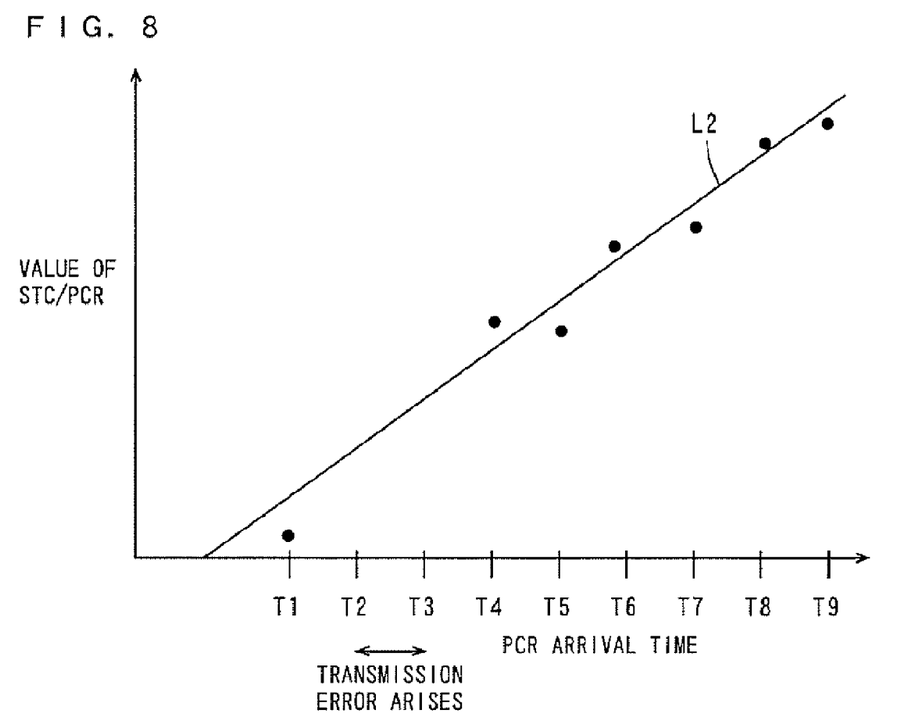
FIG. 8 is a chart showing a relation between the arrival time of the PCR, and the value of the PCR and the value of STC when the data error of the TS packet exists.

FIG. 8 is a chart showing a relation between the arrival time of the PCR, and the value of the PCR and the value of the STC when the TS packet has the data error.

In FIG. 8, the abscissa axis indicates an arrival time of the PCR at the clock reproducer 106, and the ordinate axis indicates the value of the PCR and the value of the reproduced STC. In FIG. 8, the value of the PCR arriving at the clock reproducer 106 is indicated by a dot, and the change in the value of the reproduced STC is indicated by a line L2. While in FIG. 8, the change in the value of the STC is approximately indicated by the line L2, in practice, an inclination of the line L2 is sequentially changed based on the difference value between the value of PCR and the value of the STC, as shown in FIG. 7.

In the example of FIG. 8, the data error is caused by the transmission error in the TS packet in the period from the time T2 to the time T3. The PCR, therefore, does not arrive at the clock reproducer 106 at the times T2, T3. In this case, the PCR arrives at the clock reproducer 106 at the times T1, T4, T5, T6, T7, T8, T9.

First, at the time T1, the value of the STC is set and the frequency of the reference clock CK is controlled such that the value of the STC becomes equal to the value of the PCR by the operation of the clock reproducer 106.

Next, at the times T2, T3, the PCR does not arrive at the clock reproducer 106. In this case, the frequency of the reference clock CK generated by the clock reproducer 106 is not changed from the frequency controlled at the time T1. Accordingly, the value of the STC outputted from the counter 118 increases in proportion to the time passage. That is, in the period of T1 to T4, the inclination of the line L2 is not changed.

Thereafter, at the time T4, when the PCR arrives at the clock reproducer 106, the value of the STC is set and the frequency of the reference clock CK is controlled such that the value of the STC becomes equal to a value of the new PCR by the operation of the clock reproducer 106.

At the times T5, T6, T7, T8, T9, similarly, by the operation of the clock reproducer 106, the value of the STC is set and the frequency of the reference clock CK is controlled such that the value of the STC becomes equal to a value of the new PCR, based on the value of the PCR arriving at the clock reproducer 106.

As is clear from FIG. 8, by the above-described operation of the clock reproducer 106, the value of the reproduced STC is approximated to the value of the PCR, and the frequency of the reference clock CK generated by the clock reproducer 106 becomes equal to the frequency of the reference clock in the transmitting device, even if the period of time when the PCR does not arrive at the clock reproducer 06 due to the data error occurs. That is, the reference clock CK in the transport stream processing device is synchronized with the reference clock in the transmitting device.

This allows the video signal VS and the audio signal AS to be decoded by the video decoding circuit 108 and the audio decoding circuit 110 at correct timing.

(9) Effects of Embodiment

As described above, in the transport stream processing device according to the present embodiment, if the data error arises in the TS packet including the PCR, the TS packet is deleted. This prevents the clock reproducer 106 from reproducing the STC and controlling the frequency of the reference clock CK based on the incorrect PCR. Accordingly, the normal synchronization between the reference clock CK generated by the clock reproducer 106 and the reference clock in the transmitting device can be ensured. Moreover, the synchronization processing based on the incorrect PCR is prevented from being propagated.

Furthermore, since the TS packet with the data error arising is not supplied to the clock reproducer 106, the clock reproducer 106 does not perform unnecessary synchronization processing based on the incorrect PCR. This prevents wasteful load from being caused on the synchronization processing of the TS packet by the clock reproducer 106.

(10) Correspondence between Respective Constituent Elements in Claims and Respective Components in Embodiment In the present embodiment, the clock reproducer 106 corresponds to a controller, the video decoding circuit 108 or the audio decoding circuit 110 corresponds to a transport stream processor, the AFC detector 206, the AFL detector 208 and the AF error determiner 210 of the PID filter unit 104 correspond to a detector, the TS packet filter 216 of the PID filter unit 104 corresponds to a stopper or a deleting unit. Moreover, the AFC detector 206 corresponds to a first extractor, the AFL detector 208 corresponds to a second extractor, and the AF error determiner 210 corresponds to a determiner. Furthermore, the PCR corresponds to time information, the "adaptation_field_control" corresponds to a first identifier, and the "adaptation_field_length" corresponds to a second identifier.

(11) Other Embodiments

In the above-described embodiment, if the length of the adaptation field assumed from the value of the AFC or its range and the length of the adaptation field calculated from the value of the AFL are not consistent with each other, the relevant TS packet is deleted. However, if the length of the adaptation field assumed from the value of the AFC or its range and the length of the adaptation field calculated from the value of the AFL are not consistent with each other, the adaptation field of the relevant TS packet may be invalidated to delete the adaptation field. In this case, the invalidation of the adaptation field is to set the content of the adaptation field to meaningless values. For example, all the values of the adaptation field are set to 0.

Furthermore, while in the above-described embodiment, the PCR is used as the time information (time reference value), the time information is not limited to this, but another time information for synchronizing the reference clock of the transmitting device and the reference clock of the transport stream processing device may be used. For example, as the time information, an SCR (system clock reference) may be used.

Moreover, the entire clock reproducer 106 may be realized by hardware such as an electronic circuit, or part of the clock reproducer 106 may be realized by a CPU (central processing unit) and software such as a computer program. For example, the function of the comparator 112 may be realized by a CPU and a computer program.

Furthermore, the entire PID filter unit 104 may be realized by hardware such as an electronic circuit, or part and all of the PID filter unit 104 may be realized by a CPU and software such as a computer program.

Still further, while in the above-described embodiment, the case where the transport stream processor is the video decoding circuit 108 or the audio decoding circuit 110 is described, the present invention is not limited to this, but the transport stream processor may be another processor such as a data decoder that decodes the data of the TS packet.

Moreover, while in the above-described embodiment, whether or not the TS packet has the data error is determined based on the value of the AFC and the value of the AFL as the first and second identifiers, whether or not the TS packet has the data error may be determined by another method.

Moreover, in the above-described embodiment, if the TS packet including the PCR has the data error, the TS packet is deleted to stop the control operation of the reference clock CK by the clock reproducer 106. However, if the TS packet including the time information has the data error, the control operation of the clock reproducer 106 may be stopped without deleting the TS packet. In this case, the frequency of the reference clock CK generated by the clock reproducer 106 is maintained.

Furthermore, while in the above-described embodiment, the case where the data error of the TS packet is caused by the a transmission error due to a jitter in the transmission channel is described, the transport stream processing device according to the present invention can be applied to a case where the data error of the TS packet is caused by other factors.

INDUSTRIAL APPLICABILITY

The transport stream processing device according to the present invention can be utilized in a receiving device that receives a transport stream, such as a television receiver, a reproducing device that performs reproduction of a recording medium such as a DVD, a video tape, and a hard disk, a recording device that performs recording thereof, a recording and reproducing device that performs recording and reproduction thereof, or the like.

The invention claimed is:

1. A transport stream processing device that processes a transport stream including a transport stream packet including time information, comprising:
    a controller that generates a reference clock and controls a frequency of the reference clock based on the time information included in the transport stream packet in the transport stream;
    a transport stream processor that performs predetermined processing for the transport stream in response to the reference clock generated by said controller;
    a detector that detects a data error in the transport stream packet including the time information in the transport stream; and
    a stopper that stops a control operation of the frequency of the reference clock by said controller when the data error of the transport stream packet including the time information is detected by said detector,
    wherein the transport stream packet includes information relating to an adaptation field, and
    said detector detects the data error in the transport stream packet based on the information relating to the adaptation field in the transport stream packet,
    wherein the information relating to the adaptation field in the transport stream packet includes a first identifier indicating a presence or an absence of the adaptation field and a payload in the transport stream packet, and a second identifier indicating a length of the adaptation field in the transport stream packet, and
    said detector determines a presence or an absence of the data error in the transport stream packet based on said first identifier and said second identifier.

2. The transport stream processing device according to claim 1, wherein said stopper includes a deletor that deletes at least the time information in the transport stream packet including the data error when the data error in the transport stream packet including the time information is detected by said detector.

3. The transport stream processing device according to claim 2, wherein said controller maintains the frequency of the reference clock at a specified value, from prior to deletion of the time information until new time information is supplied when at least the time information in the transport stream packet is deleted by said deletor.

4. The transport stream processing device according to claim 2, wherein said deletor deletes the transport stream packet including the data error when the data error in the transport stream packet including the time information is detected by said detector.

5. The transport stream processing device according to claim 1, wherein said detector determines that the transport stream packet has the data error when the length of the adaptation field indicated by said second identifier does not satisfy a condition of the length of the adaptation field assumed from said first identifier.

6. The transport stream processing device according to claim 5, wherein said first identifier is a value of adaptation field control indicating the presence or the absence of the adaptation field and the payload in the transport stream packet, and said second identifier is a value of an adaptation field length indicating the length of the adaptation field in the transport stream packet, and
    said detector determines that the transport stream packet has the data error when the length of the adaptation field calculated from the value of the adaptation field length is not consistent with the length of the adaptation field assumed from the value of the adaptation field control or a range of the length.

7. The transport stream processing device according to claim 6, wherein said detector includes
    a first extractor that extracts the value of the adaptation field control from the transport stream packet,
    a second extractor that extracts the value of the adaptation field length from the transport stream packet, and
    a determiner that determines whether the transport stream packet has the data error based on the value of the adaptation field control extracted by said first extractor and the value of the adaptation field length extracted by said second extractor.

8. A transport stream processing method for processing a transport stream including a transport stream packet including time information, comprising:
    generating a reference clock and controlling a frequency of the reference clock based on the time information included in the transport stream packet in the transport stream;

performing predetermined processing for the transport stream in response to said generated reference clock;

detecting a data error in the transport stream packet including the time information in the transport stream; and stopping a control operation of the frequency of the reference clock when the data error of the transport stream packet including the time information is detected, wherein the transport stream packet includes information relating to an adaptation field, and said detecting includes detecting the data error in the transport stream packet based on the information relating to the adaptation field in the transport stream packet, wherein the information relating to the adaptation field in the transport stream packet includes a first identifier indicating a presence or an absence of the adaptation field and a payload in the transport stream packet, and a second identifier indicating a length of the adaptation field in the transport stream packet, and said detecting includes determining a presence or an absence of the data error in the transport stream packet based on said first identifier and said second identifier.

9. The transport stream processing method according to claim 8, wherein said stopping includes deleting at least the time information in the transport stream packet including the data error when the data error in the transport stream packet including the time information is detected.

10. The transport stream processing method according to claim 9, wherein said controlling includes maintaining the frequency of the reference clock at a specified value, from prior to deletion of the time information until new time information is supplied when at least the time information in the transport stream packet is deleted.

11. The transport stream processing method according to claim 9, wherein said deleting includes deleting the transport stream packet including the data error when the data error in the transport stream packet including the time information is detected.

12. The transport stream processing method according to claim 8, wherein said detecting includes determining that the transport stream packet has the data error when the length of the adaptation field indicated by said second identifier does not satisfy a condition of the length of the adaptation field assumed from said first identifier.

13. The transport stream processing method according to claim 12, wherein said first identifier is a value of adaptation field control indicating the presence or the absence of the adaptation field and the payload in the transport stream packet, and said second identifier is a value of an adaptation field length indicating the length of the adaptation field in the transport stream packet, and said detecting includes determining that the transport stream packet has the data error when the length of the adaptation field indicated by the value of the adaptation field length is not consistent with the length of the adaptation field assumed from the value of the adaptation field control or a range of the length.

14. The transport stream processing method according to claim 13, wherein said detecting includes extracting the value of the adaptation field control from the transport stream packet, extracting the value of the adaptation field length from the transport stream packet, and determining whether the transport stream packet has the data error based on said extracted value of the adaptation field control and said extracted value of the adaptation field length.

15. A transport stream processing device that processes a transport stream including a transport stream packet including time information, comprising:

a controller that generates a reference clock and controls a frequency of the reference clock based on the time information included in the transport stream packet in the transport stream;

a transport stream processor that performs predetermined processing for the transport stream in response to the reference clock generated by said controller;

a detector that detects a data error in the transport stream packet including the time information in the transport stream; and a stopper that stops the control operation of the frequency of the reference clock by said controller when the data error of the transport stream packet including the time information is detected by said detector, wherein the transport stream packet includes information relating to an adaptation field, the information relating to the adaptation field in the transport stream packet including a first identifier indicating a presence or an absence of the adaptation field and a payload in the transport stream packet, and a second identifier indicating a length of the adaptation field in the transport stream packet, wherein said detector detects the data error in the transport stream packet based on said first identifier and said second identifier.

* * * * *